United States Patent
Kano et al.

(10) Patent No.: US 10,511,198 B2
(45) Date of Patent: Dec. 17, 2019

(54) ROTARY ELECTRICAL MACHINE, AND ROTOR FOR ROTARY ELECTRICAL MACHINE

(71) Applicant: Hitachi Automotive Systems, Ltd., Hitachinaka-shi, Ibaraki (JP)

(72) Inventors: Yuji Kano, Hitachinaka (JP); Hiroshi Hamano, Hitachinaka (JP); Yasuyuki Saito, Hitachinaka (JP); Ryoji Kobayashi, Hitachinaka (JP); Yosuke Umesaki, Hitachinaka (JP); Manabu Oshida, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 435 days.

(21) Appl. No.: 14/888,659

(22) PCT Filed: Mar. 7, 2014

(86) PCT No.: PCT/JP2014/055902
§ 371 (c)(1),
(2) Date: Jan. 29, 2016

(87) PCT Pub. No.: WO2014/178227
PCT Pub. Date: Nov. 6, 2014

(65) Prior Publication Data
US 2016/0141926 A1    May 19, 2016

(30) Foreign Application Priority Data

May 1, 2013    (JP) .................................. 2013-096159

(51) Int. Cl.
*H02K 1/27*        (2006.01)
*B60L 15/00*       (2006.01)
(Continued)

(52) U.S. Cl.
CPC ............. *H02K 1/276* (2013.01); *B60L 15/007* (2013.01); *B60L 15/20* (2013.01); *B60L 50/16* (2019.02);
(Continued)

(58) Field of Classification Search
CPC ........ H02K 1/2766; H02K 1/276; H02K 1/27; H02K 1/2773; H02K 1/278; H02K 21/12; H02K 21/14
(Continued)

(56) References Cited

U.S. PATENT DOCUMENTS

| 4,339,874 A | * | 7/1982 | Mc'Carty | H02K 1/278 |
| | | | | 29/598 |
| 2007/0222319 A1 | * | 9/2007 | Yoshikawa | H02K 1/276 |
| | | | | 310/156.53 |

(Continued)

FOREIGN PATENT DOCUMENTS

| DE | 10 2010 043 575 A1 | 6/2011 |
| JP | 2001-16809 A | 1/2001 |

(Continued)

OTHER PUBLICATIONS

Extended European Search Report issued in counterpart European Application No. 14791950.0 dated Nov. 24, 2016 (ten (10) pages).
(Continued)

*Primary Examiner* — Mang Tin Bik Lian
*Assistant Examiner* — Alexander Moraza
(74) *Attorney, Agent, or Firm* — Crowell & Moring LLP

(57) ABSTRACT

There is provided a rotor for a rotary electrical machine for improving mechanical strength of the rotor against centrifugal force. The rotary electrical machine is provided with a stator, and a rotor disposed with a gap from the stator, which has a rotor core. The rotor includes a magnet insertion hole, and a permanent magnet inserted into the magnet insertion
(Continued)

hole. A clearance part is formed at a position of the magnet insertion hole corresponding to a corner of the inserted permanent magnet, which has a facing surface that is formed to face a surface of the permanent magnet via a gap. The facing surface of the clearance part has inflection points so that each of obtuse angles is formed by the two facing surfaces contiguous with the inflection points.

6 Claims, 5 Drawing Sheets

(51) Int. Cl.
*B60L 15/20* (2006.01)
*B60L 50/61* (2019.01)
*B60L 50/16* (2019.01)

(52) U.S. Cl.
CPC ............ *B60L 50/61* (2019.02); *H02K 1/2766* (2013.01); *B60L 2220/50* (2013.01); *B60L 2240/12* (2013.01); *B60L 2240/421* (2013.01); *B60L 2240/423* (2013.01); *B60L 2240/429* (2013.01); *B60L 2240/441* (2013.01); *B60L 2240/443* (2013.01); *B60L 2240/529* (2013.01); *B60L 2270/145* (2013.01); *Y02T 10/6217* (2013.01); *Y02T 10/641* (2013.01); *Y02T 10/645* (2013.01); *Y02T 10/7077* (2013.01); *Y02T 10/72* (2013.01); *Y02T 10/7275* (2013.01)

(58) Field of Classification Search
USPC .......... 310/156.57, 156.56, 156.53, 216.077, 310/216.076
See application file for complete search history.

(56) References Cited

U.S. PATENT DOCUMENTS

| 2009/0079287 | A1* | 3/2009 | Hattori | H02K 1/2766 |
| | | | | 310/156.53 |
| 2012/0104892 | A1* | 5/2012 | Kamei | H02K 1/276 |
| | | | | 310/156.53 |
| 2012/0112591 | A1* | 5/2012 | Feuerrohr | H02K 1/2773 |
| | | | | 310/156.15 |
| 2012/0223607 | A1 | 9/2012 | Uchiyama et al. | |
| 2012/0274169 | A1 | 11/2012 | Saito et al. | |
| 2013/0038161 | A1* | 2/2013 | Pan | H02K 1/2773 |
| | | | | 310/156.01 |
| 2013/0057103 | A1* | 3/2013 | Han | H02K 1/2773 |
| | | | | 310/156.12 |
| 2013/0113326 | A1* | 5/2013 | Morishita | H02K 1/274 |
| | | | | 310/156.53 |
| 2013/0113327 | A1* | 5/2013 | Morishita | H02K 1/274 |
| | | | | 310/156.53 |
| 2014/0217859 | A1 | 8/2014 | Saito et al. | |
| 2015/0180292 | A1* | 6/2015 | Tanaka | H02K 1/2773 |
| | | | | 310/156.56 |

FOREIGN PATENT DOCUMENTS

| JP | 2008-211934 A | 9/2008 | |
| JP | 2010-178535 A | 8/2010 | |
| JP | 2011-101504 A | 5/2011 | |
| JP | 2011-182552 A | 9/2011 | |
| JP | 2012-186889 A | 9/2012 | |
| WO | WO-2012104715 A1 * | 8/2012 | .......... H02K 1/2766 |
| WO | WO 2013/051617 A1 | 4/2013 | |

OTHER PUBLICATIONS

International Search Report (PCT/ISA/210) issued in PCT Application No. PCT/JP2014/055902 dated May 13, 2014, with English translation (four (4) pages).

\* cited by examiner

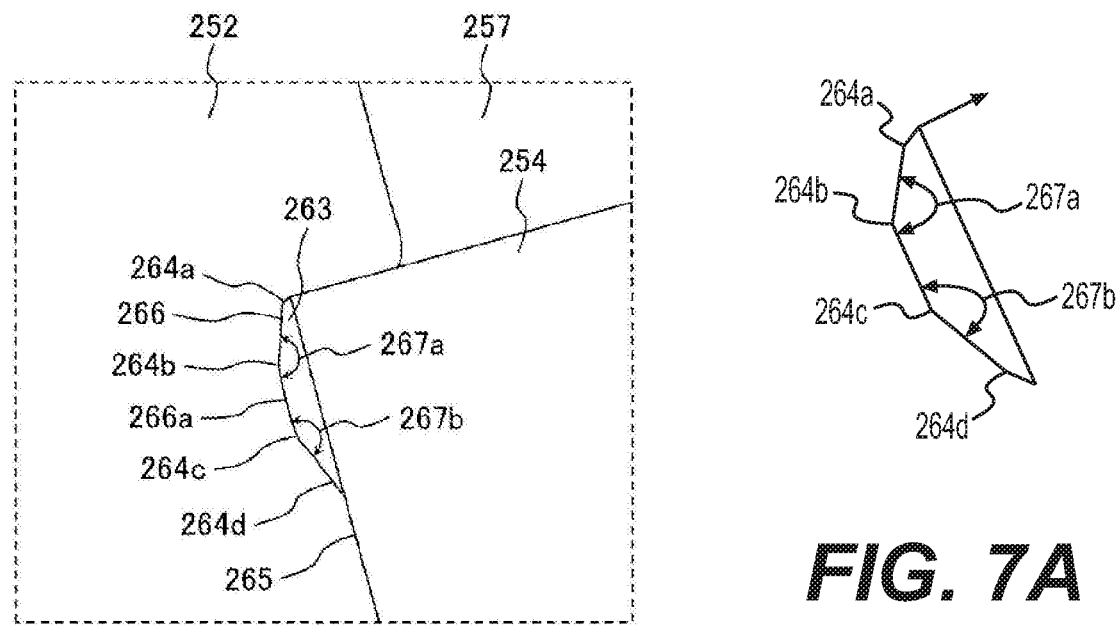
FIG. 7
FIG. 7A
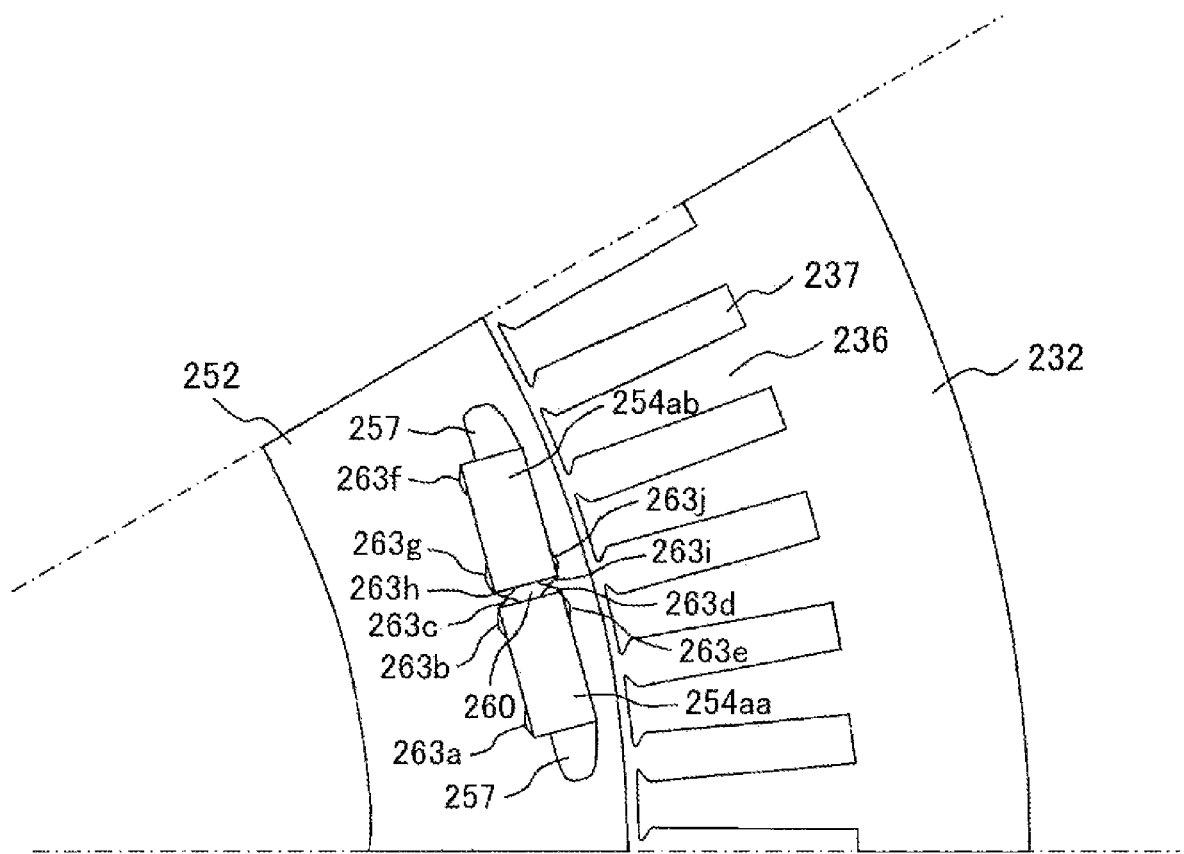
FIG. 8

ROTARY ELECTRICAL MACHINE, AND ROTOR FOR ROTARY ELECTRICAL MACHINE

TECHNICAL FIELD

The present invention relates to a rotor for a rotary electrical machine.

BACKGROUND ART

The rotary electrical machine for driving the vehicle has been demanded to be operated at higher rotation speed compared with the generally employed rotary electrical machine. In order to achieve the high-speed rotation, it is necessary to improve mechanical strength of the rotor against centrifugal force. For example, Patent Literature 1 discloses a structure of the rotary electrical machine of permanent magnet type, which is configured to establish both high output and high mechanical rotation.

CITATION LIST

Patent Literature

Patent Literature 1: Japanese Unexamined Patent Application Publication No. 2011-101504

SUMMARY OF INVENTION

Technical Problem

The rotary electrical machine disclosed in Patent Literature 1 is configured to establish both high output and high mechanical rotation. However, the mechanical strength of the rotor against centrifugal force still has to be improved for higher speed rotation.

Solution to Problem

The present invention provides a rotor for rotary electrical machine provided with a stator, and a rotor which is disposed with a gap from the stator, including a magnet insertion hole formed in a rotor core and a permanent magnet inserted into the magnet insertion hole. A clearance part is formed at a position of the magnet insertion hole corresponding to a corner of the permanent magnet, which has a facing surface and inflection points so that an obtuse angle is formed by two facing surfaces contiguous with the inflection points.

Advantageous Effects of Invention

The present invention provides the rotor for the rotary electrical machine, which improves mechanical strength of the rotor against centrifugal force by alleviating stress concentration exerted to the clearance part of the magnet insertion hole of the rotor core.

The technical problem, structure and advantageous effect other than those described above will be clarified by explanations of embodiments as described below.

BRIEF DESCRIPTION OF DRAWINGS

FIG. 7 is an enlarged view of a part B of a clearance part 263 shown in FIG. 6 according to the first embodiment of the present invention, while FIG. 7A is a further enlarged view of a part of FIG. 7.

FIG. 8 is an enlarged sectional view of the stator 230 and the rotor 250 for the single magnetic pole according to a second embodiment of the present invention.

DESCRIPTION OF EMBODIMENTS

Figure 1:
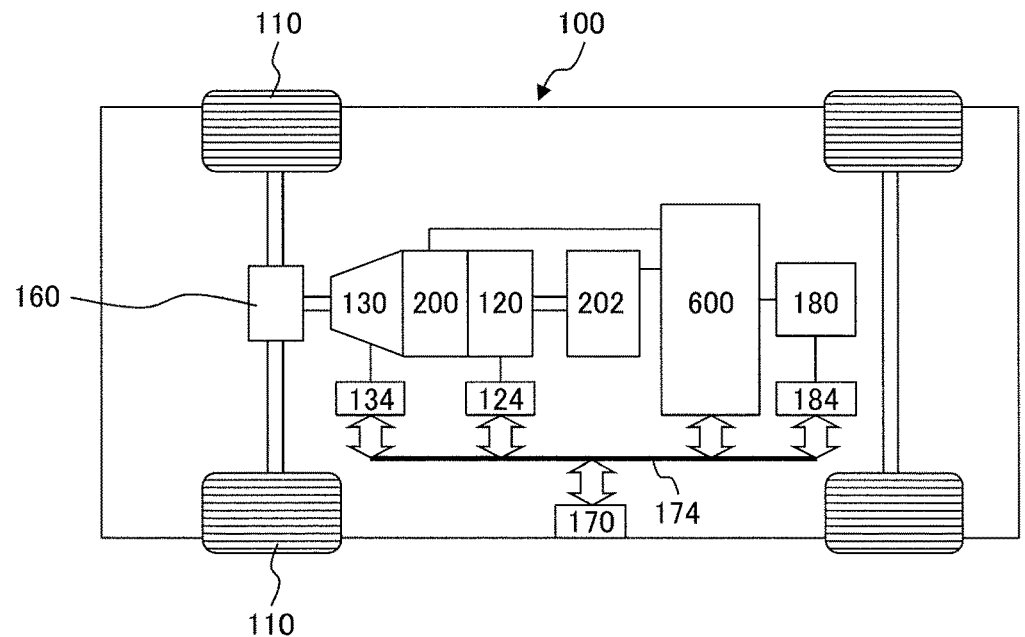
FIG. 1 is a schematic view showing a structure of a hybrid type electric car mounted with a rotary electrical machine according to an embodiment of the present invention.

Embodiments of the present invention will be described referring to the drawings.

The embodiment is configured to ensure high rotation by reducing the stress which occurs in the clearance part of the magnet insertion hole of the rotor core as described below. This embodiment is suitably applicable to the drive motor for an electric car. The rotary electrical machine according to the present invention is applicable to a genuine electric car which is driven only by the rotary electrical machine, and a hybrid type electric car which is driven by both the engine and the rotary electrical machine. The following description will be made by taking the hybrid type electric car as an example.

FIG. 1 is a schematic view showing a structure of the hybrid type electric car mounted with the rotary electrical machine according to an embodiment of the present invention. A vehicle 100 is mounted with an engine 120, a first rotary electrical machine 200, a second rotary electrical machine 202, and a battery 180. The battery 180 supplies DC power to the rotary electrical machines 200, 202, and, during regeneration traveling, receives DC power from the rotary electrical machines 200, 202. The DC power is transferred between the battery 180 and the rotary electrical machines 200, 202 via a power converter 600. The vehicle is also mounted with a not shown battery for supplying the low voltage power (for example, 14-volt power) so as to supply DC power to a control circuit to be described below.

The running torque generated by the engine 120 and the rotary electrical machines 200, 202 is transferred to front wheels 110 via a transmission 130 and a differential gear 160. The transmission 130 is controlled by a transmission control device 134, and the engine 120 is controlled by an engine control device 124. The battery 180 is controlled by a battery control device 184. The transmission control device 134, the engine control device 124, the power converter 600, the battery control device 184, and an integrated control device 170 are connected via a communication line 174.

The integrated control device 170 as a host control device of the transmission control device 134, the engine control device 124, the power converter 600, and the battery control device 184 is configured to receive information with respect to each state of the transmission control device 134, the engine control device 124, the power converter 600, and the battery control device 184, respectively via the communication line 174. Based on the received information, the integrated control device 170 computes each command for controlling the respective control devices. The computed control commands will be transmitted to the corresponding control devices via the communication line 174.

The high-voltage battery 180 constituted by a secondary battery such as a lithium ion battery and a nickel-hydrogen battery outputs high-voltage DC power ranging from 250 to 600 volts or higher. The battery control device 184 outputs the charge-discharge state of the battery 180, and each state of the unit cell batteries that constitute the battery 180 to the integrated control device 170 via the communication line 174.

The integrated control device 170 commands the power converter 600 to be in the mode of generating operation upon determination that the battery 180 needs to be charged based on the information from the battery control device 184. The integrated control device 170 mainly involves management of output torque generated by the engine 120, and the rotary electrical machines 200, 202, and computation of an integrated torque of the output torques from the engine 120 and the rotary electrical machines 200, 202, and the torque distribution ratio so as to transmit the control command based on the computation results to the transmission control device 134, the engine control device 124, and the power converter 600. Based on the torque command from the integrated control device 170, the power converter 600 controls the rotary electrical machines 200, 202 for providing the torque output or generated output as commanded.

The power converter 600 is provided with power semiconductors which constitute the inverter for operating the rotary electrical machines 200, 202. Based on the command from the integrated control device 170, the power converter 600 controls switching operations of the power semiconductor. The switching operation of the power semiconductor allows each of the rotary electrical machines 200, 202 to be operated either as an electric motor or a generator.

Upon operation of the rotary electrical machines 200, 202 as the electric motors, DC power from the high-voltage battery 180 is supplied to the DC terminal of the inverter of the power converter 600. The power converter 600 converts the DC power supplied by controlling the switching operation of the power semiconductor into three-phase AC power so as to be supplied to the rotary electrical machines 200, 202. Meanwhile, upon operation of the rotary electrical machines 200, 202 as the generators, each rotor for the rotary electrical machines 200, 202 is driven for rotation by externally applied running torque. As a result, the three-phase AC power is generated in the stator windings of the rotary electrical machines 200, 202. The generated three-phase AC power is converted into DC power by the power converter 600, which will be supplied to the high-voltage battery 180 so as to be charged.

Figure 2:
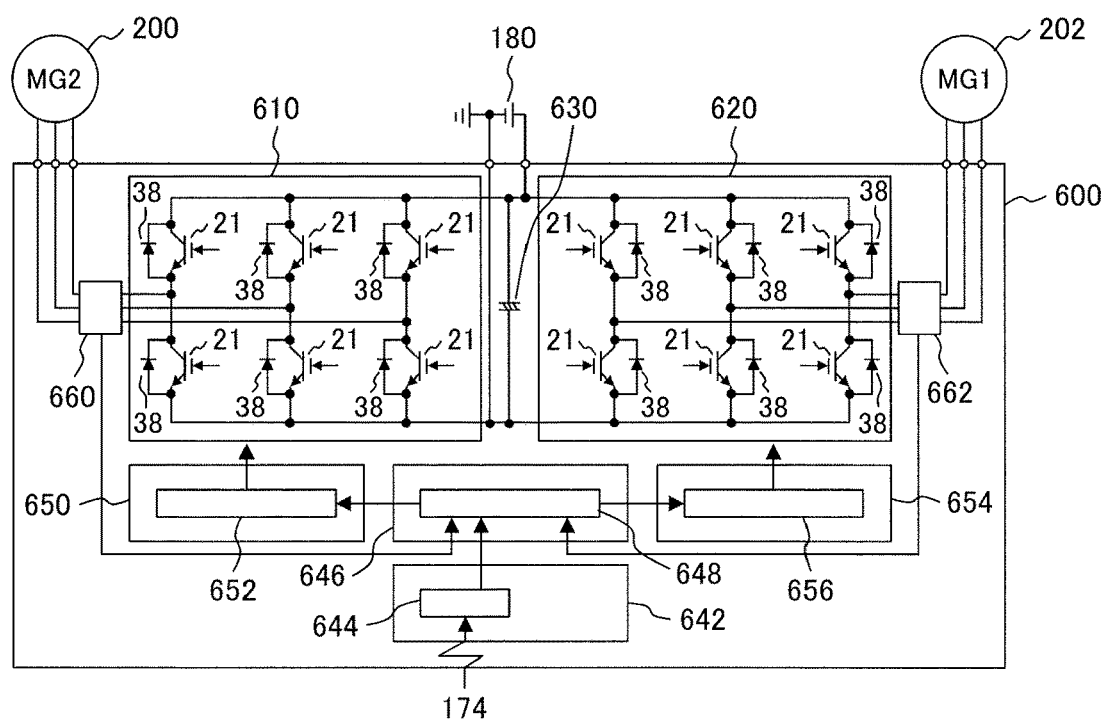
FIG. 2 is a circuit diagram of a power converter 600 according to the embodiment of the present invention.

FIG. 2 is a circuit diagram of the power converter 600 shown in FIG. 1. The power converter 600 includes a first inverter unit for the rotary electrical machine 200, and a second inverter unit for the rotary electrical machine 202. The first inverter unit includes a power module 610, a first drive circuit 652 for controlling switching operations of the respective power semiconductors 21 of the power module 610, and a current sensor 660 for detecting the current of the rotary electrical machine 200. The drive circuit 652 is mounted on a drive circuit substrate 650.

Meanwhile, the second inverter unit includes a power module 620, a second drive circuit 656 for controlling switching operations of the respective power semiconductors 21 of the power module 620, and a current sensor 662 for detecting the current of the rotary electrical machine 202. The drive circuit 656 is mounted on a drive circuit substrate 654. A control circuit 648 mounted on a control circuit substrate 646, a capacitor module 630, and a transmission-reception circuit 644 mounted on a connector substrate 642 are shared by the first and the second inverter units.

The power modules 610, 620 are driven in accordance with drive signals output from the drive circuits 652, 656, respectively. The power modules 610, 620 convert the DC power supplied from the battery 180 into the three-phase AC power so as to be supplied to the stator windings as armature windings of the corresponding rotary electrical machines 200, 202. The power modules 610, 620 convert the AC power induced in the stator windings of the rotary electrical machines 200, 202 into DC power so as to be supplied to the high-voltage battery 180.

Referring to FIG. 2, each of the power modules 610, 620 includes a three-phase bridge circuit having series circuits corresponding to the three phases electrically connected in parallel at the positive and the negative electrode sides of the battery 180. Each of the series circuits includes the power semiconductors 21 constituting an upper arm, and the power semiconductors 21 constituting a lower arm. Those power semiconductors 21 are connected in series. Each circuit structure of the power modules 610 and 620 is substantially the same as shown in FIG. 2. In the following explanation, the description will be made by taking the power module 610 as the representative example.

In this embodiment, an IGBT (Insulated Gate type Bipolar Transistor) 21 is employed for the switching power semiconductor element. The IGBT 21 includes three electrodes of a collector electrode, an emitter electrode, and a gate electrode. A diode 38 is electrically coupled between the collector electrode and the emitter electrode of the IGBT 21. The diode 38 includes two electrodes of a cathode electrode and an anode electrode. The cathode electrode is electrically coupled with the collector electrode of the IGBT 21, and the anode electrode is electrically coupled with the emitter electrode of the IGBT 21 so as to have the electrodes arranged in a forward direction from the emitter electrode to the collector electrode of the IGBT 21.

A MOSFET (Metal Oxide Semiconductor Field Effect Transistor) may also be employed for the switching power semiconductor element. The MOSFET includes three electrodes of a drain electrode, a source electrode and a gate electrode. The MOSFET includes a parasitic diode between the source electrode and the drain electrode so as to have the electrodes arranged in a forward direction from the drain electrode to the source electrode. Accordingly, the diode 38 as shown in FIG. 2 does not have to be provided.

Each arm of the respective phases is formed by electrically coupling the emitter electrode and the collector electrode of the IGBT 21 in series. The drawing according to this embodiment only shows the single IGBT for the respective upper and lower arms of the phases. Actually, because of large current capacity to be controlled, a plurality of IGBTs are electrically coupled in parallel. The description will be made with respect to the single power semiconductor for simple explanation.

In the example as shown in FIG. 2, three IGBTs are employed for constituting each of the upper and lower arms at each phase. Each collector electrode of the IGBTs 21 for the upper arms of the respective phases is electrically coupled with the positive electrode side of the battery 180, and each emitter electrode of the IGBTs 21 for the lower arms of the respective phases is electrically coupled with the negative electrode side of the battery 180. The middle point (the connection point between the emitter electrode of the IGBT at the upper arm side and the collector electrode of the IGBT at the lower arm side) of each arm at the respective phases is electrically coupled with the armature winding (stator winding) of the corresponding phase of the subject rotary electrical machines 200, 202.

The drive circuits 652, 656 constitute a drive section for controlling the corresponding inverter units (power modules 610, 620) so that the drive signal is generated for driving the IGBT 21 based on the control signal output from the control circuit 648. The drive signals generated by the respective drive circuits 652, 656 are output to gates of the power semiconductor elements of the corresponding power modules 610, 620. Six integrated circuits for generating the drive signals transmitted to the gates of the upper and lower arms at the respective phases are provided for the drive circuits 652, 656, respectively. Those six integrated circuits constitute the single block.

The control circuit 648 constitutes a control section of the respective inverter units (power modules 610, 620), which is configured as a microcomputer to compute the control signal (control value) for operating (ON-OFF) a plurality of switching power semiconductor elements. The control circuit 648 receives inputs of a torque command signal (torque command value) from the host control device, sensor outputs from the current sensors 660, 662, and sensor outputs from the rotation sensors (resolver 224 to be described later) mounted on the rotary electrical machines 200, 202. The control circuit 648 computes the control value based on those input signals, and outputs the control signal to the drive circuits 652, 656 for controlling the switching timing.

The transmission-reception circuit 644 mounted on the connector substrate 642 is intended to electrically couple the power converter 600 with the external control device for communication of the information with another device via the communication line 174 shown in FIG. 1. The capacitor module 630 constitutes a smoothing circuit for suppressing fluctuation in the DC voltage caused by the switching operation of the IGBT 21. It is electrically coupled in parallel with terminals at the DC sides of the first power module 610 and the second power module 620.

Figure 3:
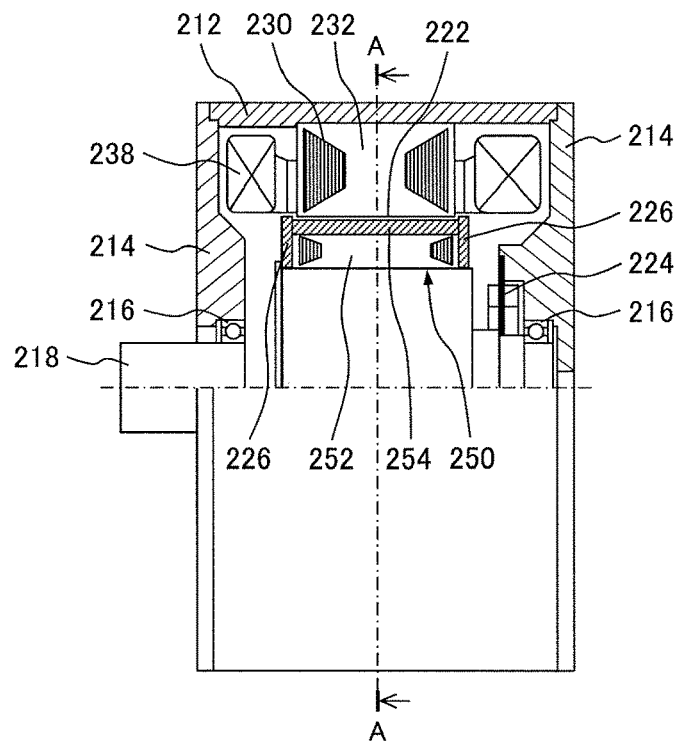
FIG. 3 is a sectional view of the rotary electrical machine according to the embodiment of the present invention.

FIG. 3 is a sectional view of the rotary electrical machine shown in FIG. 1. The rotary electrical machine 200 has substantially the same structure as that of the rotary electrical machine 202. The description with respect to the structure of the rotary electrical machine 200 will be made as a representative example hereinafter. The structure to be described below does not have to be employed for both the rotary electrical machines 200 and 202, but may be employed only for any one of them.

The stator 230 is held inside a housing 212. The stator 230 includes a stator core 232 and a stator winding 238. A rotor 250 is rotatably supported at an inner periphery of the stator core 232 via a gap. The rotor 250 includes a rotor core 252 fixed to a shaft 218, a permanent magnet 254, and a non-magnetic backing plate 226. The housing 212 includes a pair of end brackets 214 provided with bearings 216. The shaft 218 is rotatably held by those bearings 216.

The shaft 218 is provided with a resolver 224 for detecting the pole position, and rotation speed of the rotor 250. The output from the resolver 224 is incorporated into the control circuit 648 as shown in FIG. 2. The control circuit 648 outputs the control signal to the drive circuit 652 based on the incorporated output. The drive circuit 652 outputs the drive signal based on the control signal to the power module 610. The power module 610 performs the switching operation based on the control signal to convert the DC power supplied from the battery 180 into the three-phase AC power. The three-phase AC power is supplied to the stator winding 238 as shown in FIG. 3 to generate the rotating magnetic field in the stator 230. The frequency of the three-phase AC is controlled based on the output value of the resolver 224, and the phase of the three-phase AC to the rotor 250 is controlled based on the output value of the resolver 224 as well.

Figure 4:
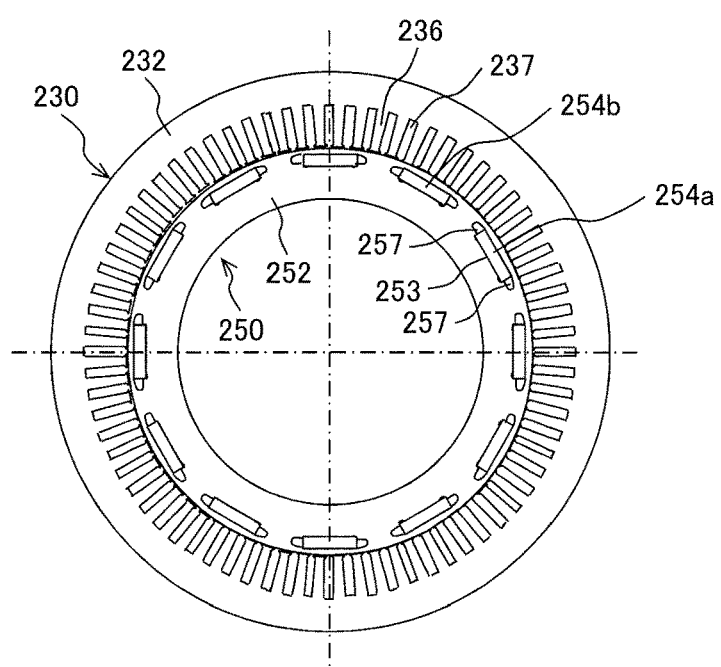
FIG. 4 is a sectional view of a stator 230 and a rotor 250 according to the embodiment of the present invention, taken along line A-A of FIG. 3.

FIG. 4 is a sectional view of the stator 230 and the rotor 250, taken along line A-A of FIG. 3. FIG. 4 omits the housing 212, the shaft 218, and the stator winding 238. A large number of slots 237 and teeth 236 are provided on the inner full circumference of the stator core 232 at equal intervals. Referring to FIG. 4, instead of numbering all the slots and teeth, only some of them are numbered as the representative example. A slot insulating material (not shown) is provided inside the slot 237, to which a plurality of phase windings including U-phase, V-phase, and W-phase constituting the stator winding 238 shown in FIG. 3 are formed. In this embodiment, 72 slots 237 are formed at equal intervals.

In a region around the outer circumference of the rotor core 252, a plurality of magnet insertion holes 253, that is, 12 holes are formed along the circumferential direction so that rectangular magnets are inserted. The respective magnet insertion holes 253 are formed along the axial direction of the rotor core 252, in which the permanent magnets 254 (254a, 254b) are embedded and fixed with adhesive, respectively. The width of the magnet insertion hole 253 in the circumferential direction is set to be larger than the width of the permanent magnet 254 in the circumferential direction. The hole formed outside the magnetic pole of the permanent magnet 254 (end portions in the circumferential direction) functions as magnetic gaps 257. The magnetic gap 257 may be filled with the adhesive, or fixed integrally with the permanent magnet 254 using the molding resin. In this embodiment, the permanent magnets 254 serve as field poles of the rotor 250, constituting the 12-pole structure.

The magnetization direction of the permanent magnet 254 is radially directed, which is reversed for each field pole. Specifically, in the state where the stator side surface of the permanent magnet 254a is at an N-pole, and the axial side surface is at an S-pole, the stator side surface of the permanent magnet 254b is at the S-pole, and the axial side surface is at the N-pole. The aforementioned permanent magnets 254a, 254b are arranged alternately in the circumferential direction.

The permanent magnet 254 may be magnetized, and then inserted into the magnet insertion hole 253. Alternatively, it may be inserted into the magnet insertion hole 253 of the rotor core 252, and then magnetized through application of strong magnetic field. As the magnetized permanent magnet 254 becomes the strong magnet, magnetization of the permanent magnet 254 before fixation to the rotor 250 will generate high suction force between the magnet and the rotor core 252 upon fixation of the permanent magnet 254, resulting in interference with the assembling work. The high suction force of the permanent magnet 254 may attract the dust, for example, iron powder. In view of productivity of the rotary electrical machine, it is preferable to magnetize the permanent magnet 254 after it is inserted into the rotor core 252.

The neodymium based, or samarium based sintered magnet, ferrite magnet, neodymium based bond magnet may be used for the permanent magnet 254. The residual magnetic flux density of the permanent magnet 254 is in the range from approximately 0.4 to 1.3 T.

As the three-phase AC is applied to the stator winding 238, the rotating magnetic field is generated in the stator 230. The rotating magnetic field acts on the permanent magnets 254a, 254b of the rotor 250 to generate torque. This torque is expressed as a product of the component of the magnetic flux from the permanent magnet 254, which is interlinked with the respective phase windings, and the component orthogonal to the interlinkage magnetic flux of the AC flowing through the respective phase windings. Assuming that the AC waveform is sinusoidal, the product of the fundamental wave component of the interlinkage magnetic flux and the fundamental wave component of the AC represents the time average component of the torque, and the product of the harmonic component of the interlinkage magnetic flux and the fundamental wave component of the AC represents the torque ripple as the harmonic component of the torque. That is, the torque ripple may be reduced by decreasing the harmonic component of the interlinkage magnetic flux. In other words, as the induced voltage is expressed as the product of the interlinkage magnetic flux and the angular acceleration of the rotating rotor, reduction in the harmonic component of the interlinkage magnetic flux is substantially the same as reduction in the harmonic component of the induced voltage.

Figure 5:
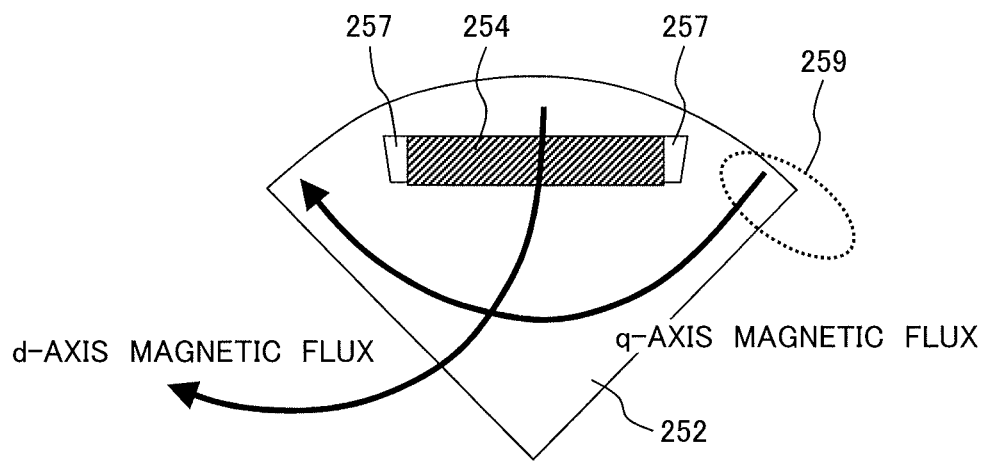
FIG. 5 is an explanatory view of a reluctance torque in the rotor for the rotary electrical machine.

FIG. 5 is an explanatory view of the reluctance torque. Generally, the axis through which the magnetic flux passes the center of the magnet is referred to as a d-axis, and the axis through which the magnetic flux flows between inter-pole sections is referred to as a q axis. The core part at the inter-pole center of the magnet is referred to as an auxiliary salient pole 259. The permanent magnet 254 provided in the rotor 250 exhibits permeability which is substantially the same as that of air. When seen from the stator side, the d-axis part is magnetically concave, and the q-axis part is magnetically convex. The core part of the q-axis is called the salient pole. Therefore, the reluctance torque is caused by the difference in passability of the magnetic flux through the axis between the d-axis and q-axis, that is, salient pole ratio.

First Embodiment

Figure 6:
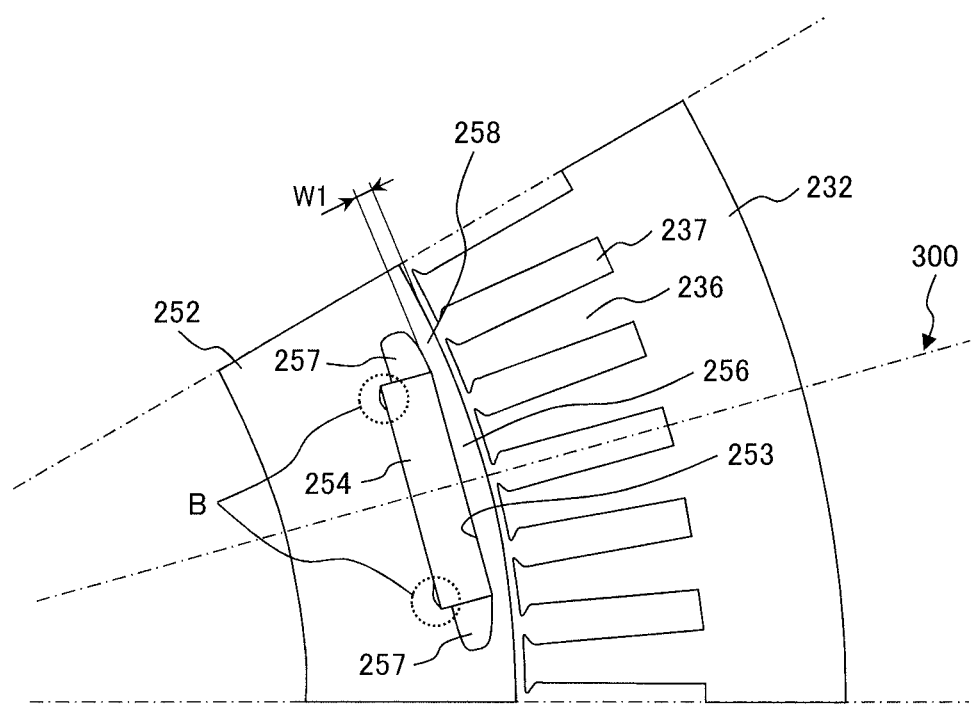
FIG. 6 is an enlarged sectional view of the stator 230 and the rotor 250 according to a first embodiment of the present invention for a single magnetic pole.

FIGS. 6 and 7 show a structure of the first embodiment according to the present invention. FIG. 6 is an enlarged sectional view of the single magnetic pole shown in FIG. 4. FIG. 7 is an enlarged view of a part B shown in FIG. 6. Referring to FIG. 6, the rotor core 252 has magnetic gaps 257 at the outer side of the magnetic pole of the permanent magnet 254 (orthogonal to the magnetization direction). Such gap is formed to reduce the cogging torque and torque pulsation upon current application. Furthermore, the thickness of the magnetic gap 257 in the radial direction is smaller than the thickness of the permanent magnet 254 in the radial direction so that the rotor core at the inner periphery of the magnetic gap 257 regulates movement of the permanent magnet 254 in the circumferential direction. A core 256 between the magnetic insertion hole 253 into which the permanent magnet 254 is inserted and the outer periphery of the rotor core 252 is configured to have the smallest width W1 of a pole tip bridge 258 in the radial dimension.

The magnet insertion hole 253 has clearance parts 263 as shown in FIG. 7 at both peripheral ends of the permanent magnet 254 at the inner periphery of the rotor core 252 so as not to be in contact with corners of the magnet 254. The clearance parts 263 are symmetrically formed with respect to a d-axis 300 shown in FIG. 6, through which the magnetic flux passes the magnet center.

The clearance part 263 has a facing surface 266 which faces the surface of the permanent magnet 254 inserted into the magnet insertion hole 253 via the gap at the axial center of the rotor cover 252. The facing surface 266 is formed by machining the rotor core 252 so as to be contiguous with the magnet insertion hole 253.

The facing surface 266 of the clearance part 263 includes four inflection points so that two facing surfaces contiguous with the inflection points form the obtuse angle.

FIG. 7 is a sectional view taken along line A-A of FIG. 3, that is, the cross section formed by cutting the plane defined by circumferential and radial lines of the rotor core 252, while FIG. 7A is an enlarged view of a portion of FIG. 7. FIGS. 7 and 7A show the four inflection points designated with 264a to 264d. In the following description, the inflection part will be expressed by the inflection points, and, of the facing surface 266, the facing surface formed by connecting the adjacent inflection points is linearly expressed.

The respective lines derived from connecting the four inflection points 264a to 264d form the obtuse angles. That is, the line for connecting the inflection points 264a and 264b, and the line for connecting the inflection points 264b and 264c form an obtuse angle 267a. The line for connecting the inflection points 264b and 264c, and the line for connecting the inflection points 264c and 264d also form an obtuse angle 267b.

In this embodiment, the clearance part is formed into a trapezoidal shape having a boundary 265 between the permanent magnet 254 and the magnet insertion hole 253 for regulating the side of the rotor core 252 in the circumferential direction as the lower base, and a side 266a (line connecting the inflection points 264b and 264c) of the clearance part 263 close to the inner periphery of the rotor core as the upper side. Therefore, the side 266a is formed parallel to the surface of the permanent magnet 254 at the counter side.

The inflection points 264a to 264d cannot be cornered because of the rotor core manufacturing, each of which has a corner equal to or smaller than a particular value. The corner is included by the inflection point. This embodiment uses the line formed by connecting the inflection points of the clearance part 263. It is also possible to use the boundary line with large radius of curvature.

The aforementioned structure allows stress dispersion to the respective angled parts defined by the inflection points 264a to 264d of the clearance part 263. As a result, stress to the clearance part 263 may be reduced by avoiding the stress concentration to the specific angled part, thus allowing high speed rotation of the rotor 250.

In other words, the clearance part 263 having the inflection points and each obtuse angle formed by two lines contiguous with the points ensures suppression of the stress concentration.

The obtuse angle formed by the two lines contiguous with the inflection points, and the line (the facing surface of the clearance part 263) parallel to the surface of the permanent magnet 254 such as the side 266a shown in FIG. 7 allow the clearance part 263 to be shaped parallel to the direction of the vector of the stress. This makes it possible to further improve the stress concentration suppression effect.

Four or more inflection points (inflection part) are sufficient to allow the two lines contiguous with the inflection points to form the obtuse angle easily. Therefore, the more the number of the inflection points becomes, the higher the stress concentration suppression effect is improved.

In the case of three inflection points, the stress concentration suppression effect is less effective than the case of four or more inflection points. However, the stress concentration suppression effect is still expected so long as the two lines contiguous with the inflection points form the obtuse angle.

In this embodiment, an air layer is formed inside the clearance part 263 for dispersing the stress concentration. Therefore, it is difficult for the magnetic flux generated by the permanent magnet 254 to pass through such space than the inside of the rotor core 252. A large number of the clearance parts 263, for example, provided in the magnetization direction may be a little inferior in the efficient use of magnetic force of the magnet.

Referring to the embodiment shown in FIG. 6, among four corners of the permanent magnet 254, those at the outer peripheral side of the rotor core 252 have no clearance parts. However, it is possible to form the clearance part at those at the outer peripheral side.

The inside of the clearance part 263 is not necessarily formed as the air layer, but may be filled with the non-magnetic body which hardly passes the magnetic flux, for example the adhesive and resin, or the magnetic body which allows easy passage of the magnetic flux so long as such material has lower Young's modulus than that of the rotor core 252. The resultant stress reducing effect is similar to the one derived from the air layer inside the clearance part.

Second Embodiment

FIG. 8 is an enlarged sectional view (taken along line A-A of FIG. 3) of the rotary electrical machine according to a second embodiment of the present invention. In the second embodiment, the permanent magnet 254 (and magnet insertion hole) for the single magnetic pole is divided into a pair of permanent magnets 254*aa* and 254*ab* in the circumferential direction in order to improve mechanical strength of the rotor core 252 against centrifugal force during rotation. An inter-magnet bridge portion 260 is provided between those permanent magnets so as to mechanically connect the rotor cores at the outer and inner peripheral sides of the permanent magnets.

The second embodiment is configured to provide clearance parts at four facing corners of the paired permanent magnets 254*aa*, 254*ab* having the inter-magnet bridge portion 260 interposed between those magnets so as to reduce the stress concentration generated in the inter-magnet bridge portion 260.

Specifically, ten clearance parts 263*a* to 263*j*, each of which is similar to the clearance part 263 described referring to FIG. 7, are formed for the paired permanent magnets 254*aa*, 254*ab*, respectively.

The clearance parts 263 at the side of the inter-magnet bridge portion 260 include those formed at the radial side (263*b*, 263*e*, 263*g*, 263*j*), and the circumferential side (263*c*, 263*d*, 263*h*, 263*i*). However, they may be formed only either at the radial side or at the circumferential side. The paired permanent magnets 254*aa*, 254*ab* for the single magnetic pole are linearly arranged. They may be arranged in the manner other than linearly, which may still provide the advantageous effects of the present invention.

As described above, the second embodiment is configured to provide the rotor having the permanent magnet for the single magnetic pole divided into a pair of permanent magnets to ensure reduction in the stress to the clearance part by suppressing the stress concentration to the respective corners of the permanent magnets. This makes it possible to realize high-speed rotation of the rotor. The inter-magnet bridge portion 260 disposed between the divided permanent magnets in pairs, resulting in high strength.

Third Embodiment

Figure 9:
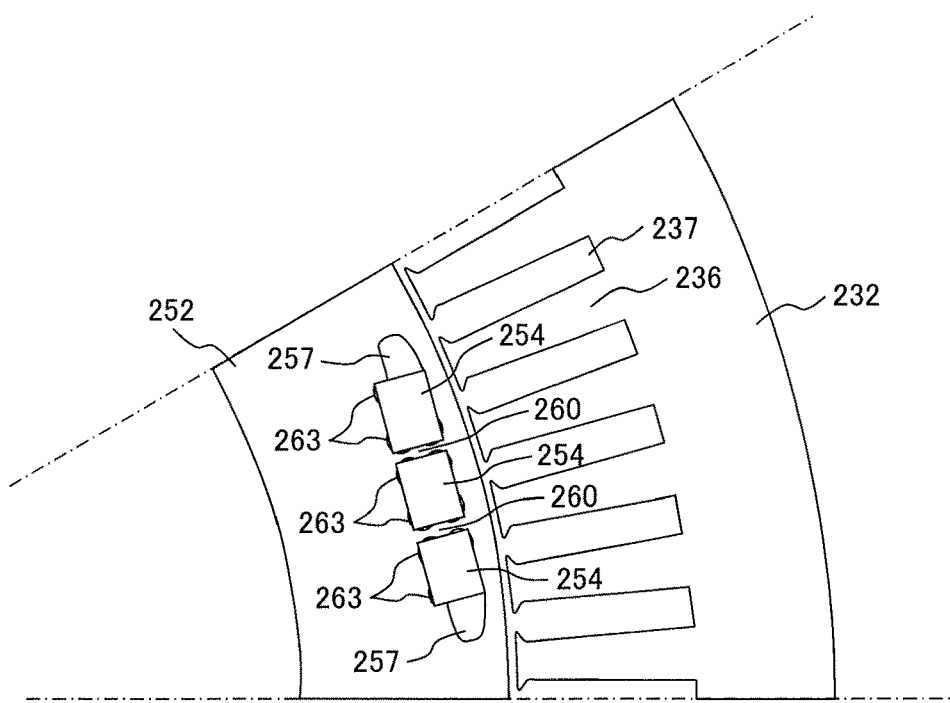
FIG. 9 is an enlarged sectional view of the stator 230 and the rotor 250 for the single magnetic pole according to a third embodiment of the present invention.

FIG. 9 is an enlarged sectional view (taken along line A-A) of the rotary electrical machine according to a third embodiment of the present invention. The third embodiment is configured to have the permanent magnet 254 (and magnet insertion hole) constituted by three (or more) divided sections for the single magnetic pole. The inter-magnet bridge portions 260 are provided between the divided permanent magnets, respectively, and the clearance parts 263 are also formed at the corners of the facing permanent magnets 254 having the inter-magnet bridge portion 260 interposed therebetween as described referring to FIG. 7.

According to the third embodiment, the rotor has three or more divided permanent magnets for the single magnetic pole to reduce the stress to the clearance part by suppressing the stress concentration to the respective corners of the permanent magnets. This makes it possible to realize high-speed rotation of the rotor. The inter-magnet bridge portions 260 are interposed between the divided permanent magnets, resulting in high strength.

Fourth Embodiment

Figure 10:
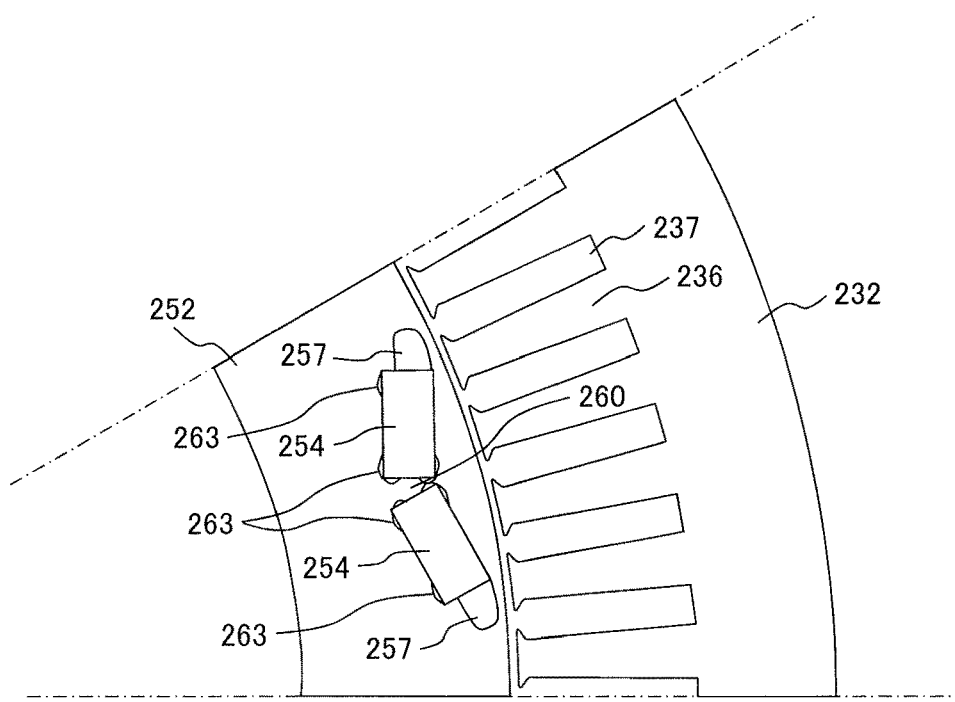
FIG. 10 is an enlarged sectional view of the stator 230 and the rotor 250 for the single magnetic pole according to a fourth embodiment of the present invention.

FIG. 10 is an enlarged sectional view (taken along line A-A of FIG. 3) of the rotary electrical machine according to a fourth embodiment of the present invention. The fourth embodiment is configured to arrange two divided permanent magnets 254 (and magnet insertion holes) in pairs for the single magnetic pole so as to form a V-like cross section having the inter-magnet bridge portion 260 interposed therebetween without being linearly arranged as shown in FIG. 8. Like the clearance parts 263*a* to 263*j* as shown in FIG. 8, the clearance parts 263 are formed at the respective corners of the permanent magnets.

According to the fourth embodiment, the rotor is configured to divide the permanent magnet for the single magnetic pole into two sections, which are arranged to form the V-like cross section shape. This structure ensures reduction in the stress to the clearance part by suppressing the stress concentration to the respective corners of the permanent magnet, resulting in high rotation of the rotor. The inter-magnet bridge portion 260 is disposed between the divided paired permanent magnets, resulting in high strength. The divided paired permanent magnets are arranged to form the V-like cross section so as to allow easy passage of the magnetic flux, resulting in large reluctance torque.

The present invention is not limited to the embodiments as described above, and may include various modifications. The embodiments have been described in detail for better understanding of the present invention, and are not necessarily restricted to the one provided with all the structures of the description. The structure of any one of the embodiments may be partially replaced with that of another embodiment.

Alternatively, it is possible to add the structure of any one of the embodiment to that of another embodiment. It is also possible to have the part of the structure of the respective embodiments added to, removed from and replaced with another structure.

REFERENCE SIGNS LIST 100 vehicle
230 stator
250 rotor
252 rotor core
254, 254a, 254b, 254aa, 254ab permanent magnet
257 magnetic gap
258 pole tip bridge
260 inter-magnet bridge portion
263, 263a to 263j clearance part
264a to 264d inflection point
265 boundary
266 facing surface
266a side

The invention claimed is:

1. A rotor for rotary electrical machine provided with a stator, the rotor comprising:
    a rotor core including a plurality of magnetic poles, each magnetic pole of the rotor having a magnet insertion hole formed in the rotor core, and a permanent magnet inserted into the magnet insertion hole so that a gap in a circumferential direction of the rotor has a gap boundary defined by one circumferentially oriented end of the permanent magnet and an adjacent end surface of the magnet insertion hole defined by the rotor core, wherein
    each magnet insertion hole defines a clearance part formed at a position of the magnet insertion hole corresponding to corners at both peripheral ends of the inserted permanent magnet closest to an inner periphery of the rotor core,
    at least one said clearance part has a facing surface that is formed to face a radially inwardly oriented surface of the permanent magnet counter to the facing surface of the clearance part,
    the facing surface of the at least one said clearance part has facing surface sections between points at which the facing surface changes direction extending linearly between the points so that two obtuse angles are formed by three straight portions of the facing surface contiguous with the points at which the facing surface changes direction, and
    the center portion of the three straight portions is parallel to the radially inwardly oriented surface of the permanent magnet counter to the facing surface of the clearance part.

2. The rotor for rotary electrical machine according to claim 1, wherein the at least one said clearance part includes four or more of said points at which the facing surface changes direction.

3. The rotor for rotary electrical machine according to claim 2, wherein the four or more points at which the facing surface changes direction divide the facing surface into at least five facing surface sections.

4. The rotor for rotary electrical machine according to claim 1,
    wherein the rotor includes a plurality of divided permanent magnets for a single magnetic pole, and a plurality of magnet insertion holes through which the permanent magnets are respectively inserted, and
    the at least one said clearance part includes multiple clearance parts provided at each position of the magnet insertion holes corresponding to the corners of the divided permanent magnets.

5. The rotor for rotary electrical machine according to claim 4, wherein the divided permanent magnets are a pair of permanent magnets, which are arranged to form a V-like cross section shape.

6. A rotary electrical machine comprising the rotor according to claim 1.

* * * * *